US008532497B2

(12) United States Patent
Chan et al.

(10) Patent No.: US 8,532,497 B2
(45) Date of Patent: *Sep. 10, 2013

(54) OPTICAL POWER TRANSMISSION SYSTEM AND METHOD HAVING MULTIPLE OPTICAL POWER FORMS WITH PARTIAL FREE-SPACE TRANSMISSION

(75) Inventors: Alistair K. Chan, Bainbridge Island, WA (US); Roderick A. Hyde, Redmond, WA (US); Muriel Y. Ishikawa, Livermore, CA (US); Jordin T. Kare, Seattle, WA (US); Lowell L. Wood, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 302 days.

This patent is subject to a terminal disclaimer.

(21) Appl. No.: 12/800,240

(22) Filed: May 11, 2010

(65) Prior Publication Data

US 2011/0278481 A1    Nov. 17, 2011

Related U.S. Application Data

(63) Continuation-in-part of application No. 12/800,232, filed on May 11, 2010, now Pat. No. 8,472,764, and a continuation-in-part of application No. 12/800,229, filed on May 11, 2010, and a continuation-in-part of application No. 12/800,230, filed on May 11, 2010, and a continuation-in-part of application No. 12/800,239, filed on May 11, 2010, and a continuation-in-part of application No. 12/800,238, filed on May 11, 2010, and a continuation-in-part of application No. 12/800,236, filed on May 11, 2010, and a continuation-in-part of application No. 12/800,235, filed on May 11, 2010, and a continuation-in-part of application No. 12/800,237, filed on May 11, 2010.

(51) Int. Cl.
*H04B 10/00* (2013.01)
*H04B 10/12* (2011.01)

(52) U.S. Cl.
USPC ............ 398/171; 398/118; 398/120; 398/130

(58) Field of Classification Search
USPC .......................................... 398/118–131, 171
See application file for complete search history.

(56) References Cited

U.S. PATENT DOCUMENTS

| | | | |
|---|---|---|---|
| 4,623,869 A | 11/1986 | Marubashi | |
| 4,905,309 A | 2/1990 | Maisonneuve et al. | |
| 4,998,294 A * | 3/1991 | Banks et al. | 398/171 |
| 5,099,144 A | 3/1992 | Sai | |
| 5,745,274 A | 4/1998 | Fatehi et al. | |
| 5,771,114 A | 6/1998 | Andersson et al. | |
| 5,778,116 A * | 7/1998 | Tomich | 385/16 |

(Continued)

OTHER PUBLICATIONS

PCT International Search Report; International Application No. PCT/US2011/000836; Feb. 1, 2012; pp. 1-4.

(Continued)

*Primary Examiner* — Danny Leung
*Assistant Examiner* — Daniel Dobson
(74) *Attorney, Agent, or Firm* — Foley & Lardner LLP

(57) ABSTRACT

A system for delivering optical power over an optical conduit includes at least one than one optical power source delivering multiple optical power forms at least partially over a free space.

51 Claims, 11 Drawing Sheets

(56) References Cited

U.S. PATENT DOCUMENTS

| | | | |
|---|---|---|---|
| 5,796,890 A | 8/1998 | Tsuji et al. | |
| 5,801,860 A | 9/1998 | Yoneyama | |
| 5,801,872 A | 9/1998 | Tsuji | |
| 6,069,721 A | 5/2000 | Oh et al. | |
| 6,331,908 B1 | 12/2001 | Adams et al. | |
| 6,535,660 B1 | 3/2003 | Judy | |
| 6,538,784 B1 | 3/2003 | Lee et al. | |
| 6,819,877 B1 | 11/2004 | Carter et al. | |
| 7,039,314 B2 | 5/2006 | Taketomi | |
| 7,099,533 B1 | 8/2006 | Chenard | |
| 7,187,819 B1* | 3/2007 | Silveira et al. | 385/16 |
| 7,693,379 B2 | 4/2010 | Imamura | |
| 7,941,022 B1* | 5/2011 | Schaffner et al. | 385/127 |
| 2001/0018848 A1 | 9/2001 | Autrey et al. | |
| 2002/0048061 A1 | 4/2002 | Glingener et al. | |
| 2002/0048070 A1 | 4/2002 | Gabitov | |
| 2003/0193955 A1 | 10/2003 | Beshai | |
| 2004/0052524 A1 | 3/2004 | Arnold | |
| 2004/0131366 A1 | 7/2004 | Tsushima et al. | |
| 2004/0202474 A1* | 10/2004 | Britz | 398/118 |
| 2005/0031351 A1 | 2/2005 | Nishimura et al. | |
| 2005/0226625 A1 | 10/2005 | Wake et al. | |
| 2006/0018658 A1 | 1/2006 | Mori | |
| 2007/0062696 A1 | 3/2007 | Wilson et al. | |
| 2008/0018545 A1 | 1/2008 | Kaplan et al. | |
| 2008/0025676 A1 | 1/2008 | Wang | |
| 2008/0085118 A1 | 4/2008 | Effenberger | |
| 2008/0219300 A1 | 9/2008 | Krupkin et al. | |
| 2008/0235418 A1* | 9/2008 | Werthen et al. | 710/106 |
| 2008/0277565 A1 | 11/2008 | Bookbinder et al. | |
| 2009/0034968 A1 | 2/2009 | Cherchi | |
| 2009/0092394 A1 | 4/2009 | Wei et al. | |
| 2009/0097515 A1 | 4/2009 | Harter et al. | |
| 2009/0154925 A1 | 6/2009 | Chen | |
| 2009/0180782 A1 | 7/2009 | Bernard et al. | |
| 2009/0310619 A1 | 12/2009 | Brommer | |
| 2010/0012819 A1 | 1/2010 | Graham | |
| 2011/0116647 A1 | 5/2011 | Terlizzi et al. | |
| 2011/0278479 A1 | 11/2011 | Chan et al. | |

OTHER PUBLICATIONS

PCT International Search Report; International App. No. PCT/US 11/00835; Nov. 18, 2011; pp. 1-4.

Dutton, Harry J. R.; "Understanding Optical Communications"; International Technical Support Organization; bearing a date of Sep. 1998; pp. 98-101 (plus 4 additional cover pages); First Edition; International Business Machines Corporation.

Werthen et al.; "The Power of Light: Photonic Power Innovations in Medical, Energy and Wireless Applications"; Photonics Spectra Magazine; bearing a date of May 1, 2006; pp. 1-5; Laurin Publishing; located at: http://photonics.com/Article.aspx?AID=25278.

* cited by examiner

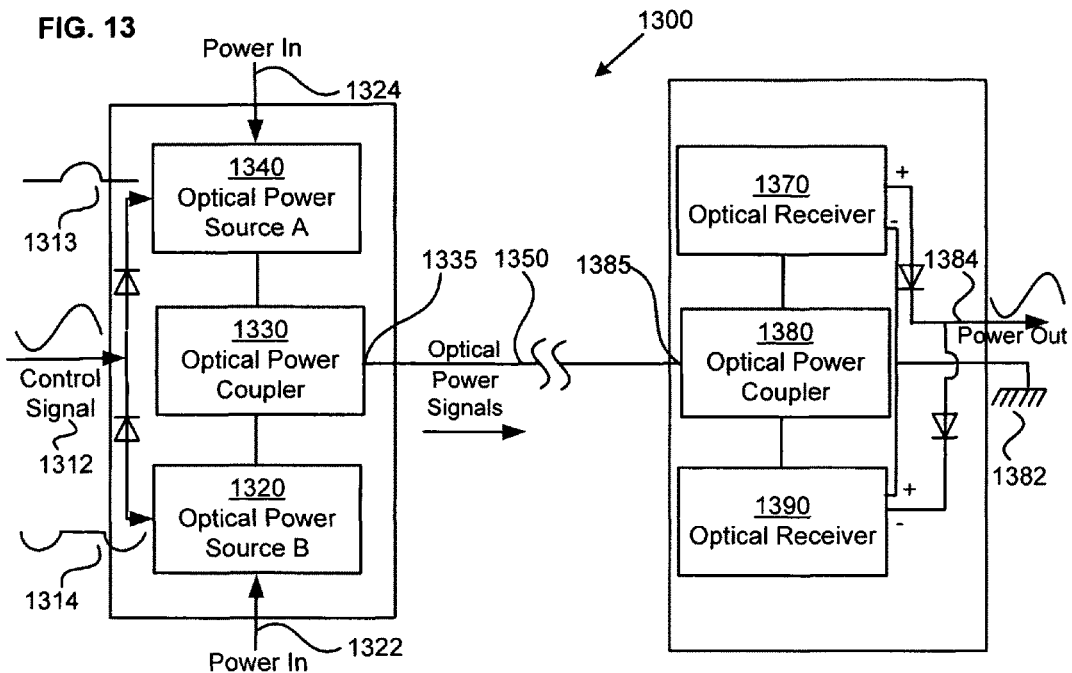
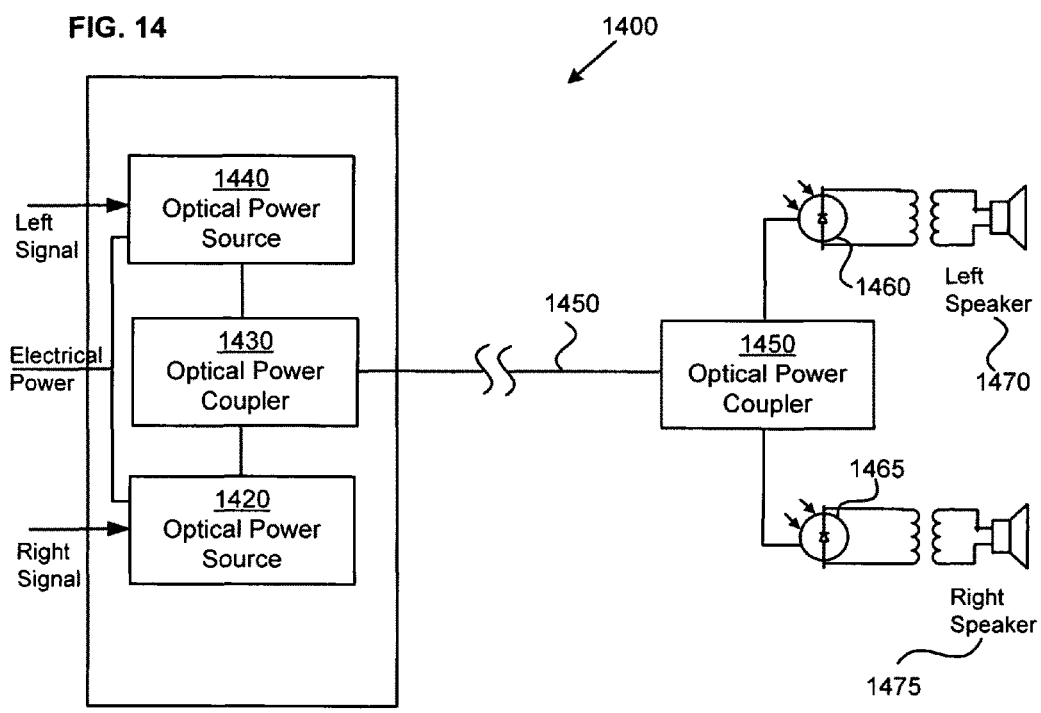

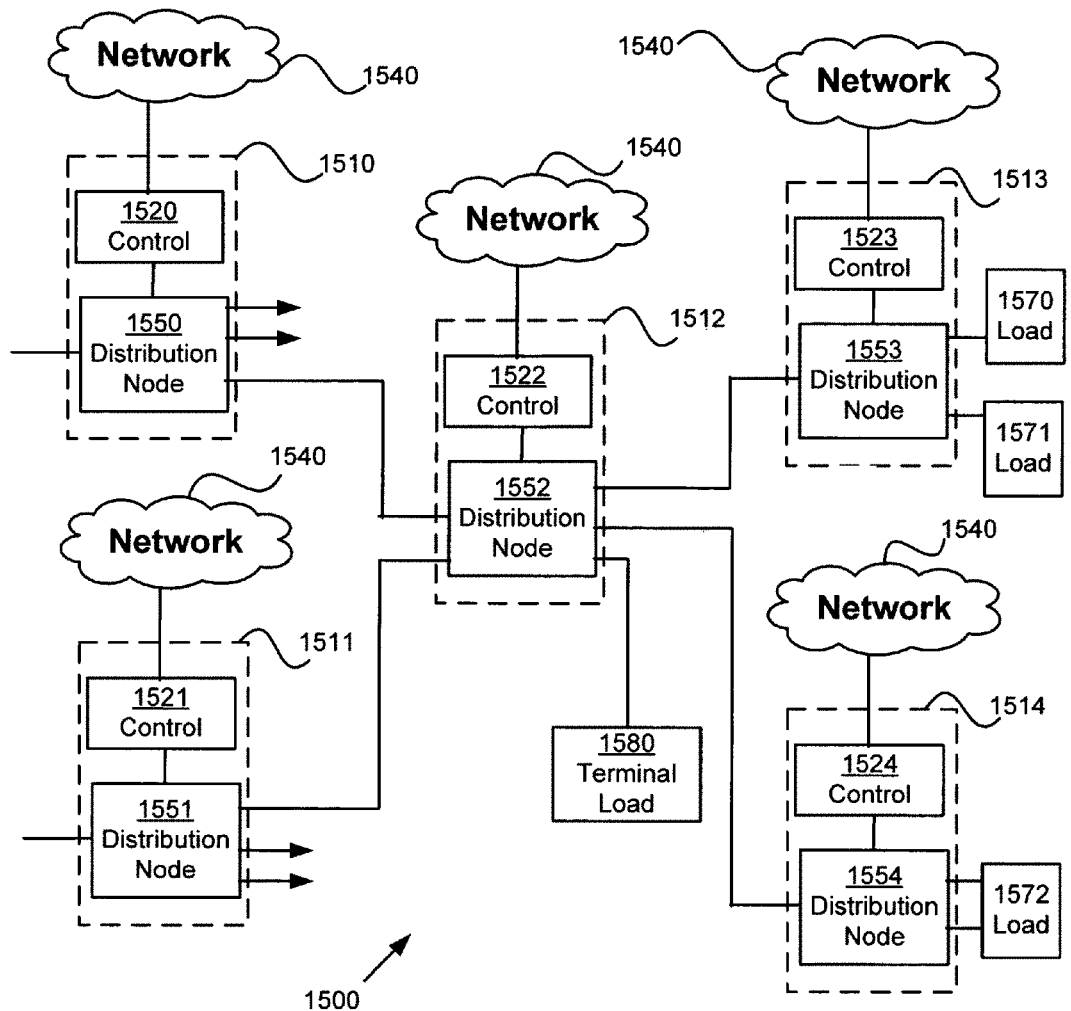

OPTICAL POWER TRANSMISSION SYSTEM AND METHOD HAVING MULTIPLE OPTICAL POWER FORMS WITH PARTIAL FREE-SPACE TRANSMISSION

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of U.S. patent application Ser. No. to be assigned, entitled OPTICAL POWER TRANSMISSION SYSTEM AND METHOD HAVING MULTIPLE OPTICAL POWER FORMS, naming Alistair K. Chan, Roderick A. Hyde, Muriel Y. Ishikawa, Jordin T. Kare, and Lowell L. Wood, Jr. as inventors, filed 11 May 2010, which is currently co-pending, or is an application of which a currently co-pending application is entitled to the benefit of the filing date.

For purposes of the USPTO extra-statutory requirements, the present application constitutes a continuation-in-part of U.S. patent application Ser. No. to be assigned, entitled OPTICAL POWER TRANSMISSION SYSTEM AND METHOD HAVING CO-PROPAGATING CONTROL SIGNAL, naming Alistair K. Chan, Roderick A. Hyde, Muriel Y. Ishikawa, Jordin T. Kare, and Lowell L. Wood, Jr. as inventors, filed 11 May 2010, which is currently co-pending, or is an application of which a currently co-pending application is entitled to the benefit of the filing date.

For purposes of the USPTO extra-statutory requirements, the present application constitutes a continuation-in-part of U.S. patent application Ser. No. to be assigned, entitled OPTICAL POWER TRANSMISSION SYSTEM AND METHOD HAVING COUNTER-PROPAGATING CONTROL SIGNAL, naming Alistair K. Chan, Roderick A. Hyde, Muriel Y. Ishikawa, Jordin T. Kare, and Lowell L. Wood, Jr. as inventors, filed 11 May 2010, which is currently co-pending, or is an application of which a currently co-pending application is entitled to the benefit of the filing date.

For purposes of the USPTO extra-statutory requirements, the present application constitutes a continuation-in-part of U.S. patent application Ser. No. to be assigned, entitled OPTICAL POWER DISTRIBUTION SYSTEM, naming Alistair K. Chan, Roderick A. Hyde, Muriel Y. Ishikawa, Jordin T. Kare, and Lowell L. Wood, Jr. as inventors, filed 11 May 2010, which is currently co-pending, or is an application of which a currently co-pending application is entitled to the benefit of the filing date.

For purposes of the USPTO extra-statutory requirements, the present application constitutes a continuation-in-part of U.S. patent application Ser. No. to be assigned, entitled OPTICAL POWER SOURCE MODULATION SYSTEM, naming Alistair K. Chan, Roderick A. Hyde, Muriel Y. Ishikawa, Jordin T. Kare, and Lowell L. Wood, Jr. as inventors, filed 11 May 2010, which is currently co-pending, or is an application of which a currently co-pending application is entitled to the benefit of the filing date.

For purposes of the USPTO extra-statutory requirements, the present application constitutes a continuation-in-part of U.S. patent application Ser. No. to be assigned, entitled OPTICAL POWER DISTRIBUTION DEVICE AND METHOD, naming Alistair K. Chan, Roderick A. Hyde, Muriel Y. Ishikawa, Jordin T. Kare, and Lowell L. Wood, Jr. as inventors, filed 11 May 2010, which is currently co-pending, or is an application of which a currently co-pending application is entitled to the benefit of the filing date.

For purposes of the USPTO extra-statutory requirements, the present application constitutes a continuation-in-part of U.S. patent application Ser. No. to be assigned, entitled OPTICAL POWER TRANSMISSION SYSTEMS AND METHODS, naming Alistair K. Chan, Roderick A. Hyde, Muriel Y. Ishikawa, Jordin T. Kare, and Lowell L. Wood, Jr. as inventors, filed 11 May 2010, which is currently co-pending, or is an application of which a currently co-pending application is entitled to the benefit of the filing date.

For purposes of the USPTO extra-statutory requirements, the present application constitutes a continuation-in-part of U.S. patent application Ser. No. to be assigned, entitled OPTICAL POWER TRANSMISSION PACKETING SYSTEMS AND METHODS, naming Alistair K. Chan, Roderick A. Hyde, Muriel Y. Ishikawa, Jordin T. Kare, and Lowell L. Wood, Jr. as inventors, filed 11 May 2010, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, *Benefit of Prior-Filed Application*, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

BACKGROUND

The description herein generally relates to the field of optical power systems. Further, the description generally relates to the field of optical power systems and advancements related to optical power systems for delivering optical power over a distance to devices.

Conventionally, there is a need for the delivery of multiple forms of optical power via optical fiber or other optical conduits in order to power devices. There is a need for improving such methods and providing customization and control of optical power in different forms, in different modes, and to different receivers and/or different devices or output nodes.

SUMMARY

In one aspect, a method of transmitting power includes generating at least a first optical power form and a second optical power form. The method also includes transmitting at least the first optical power form and the second optical power form at least partially over free space. Further, the method includes receiving at least the first optical power form by a first optical receiver and the second optical power form by a second optical receiver. Further still, the method includes converting the first optical power form into a first power output having a first power form and a second power output having a second power form.

In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer. Also various structural elements may be employed depending on design choices of the system designer.

In one aspect, a system for an optical power system includes at least one optical power source providing at least two different optical power forms. The system includes a first optical coupler configured to provide the first optical form and the second optical form to a common output of the first optical coupler. The system also includes a second optical coupler configured to receive the first and second optical power forms through a common input and divide the first optical power form and the second optical power form between a first output and a second output of the second optical coupler. Further still, the system includes a free space transmitter coupled to the first optical coupler for transmitting the first optical power form and the second optical power form over free space for a distance. Yet further still, the system includes a free space collector configured to receive the first optical power form and the second optical power form and to provide the optical power forms to the second optical coupler. Yet further still, the system includes a first optical receiver coupled to the first output of the second optical coupler and configured to convert at least the first optical power form into at least one first output power form. Yet further still, the system includes a second optical receiver coupled to the second output of the second optical coupler and configured to convert at least the second optical power form into at least one second output power form.

In another aspect, a system for a power transmission system includes a means for generating at least a first optical power form and a second optical power form. The system also includes a means for transmitting at least the first optical power form and the second optical power form at least partially over free space. The method further includes a means for receiving at least the first optical power form by a first optical receiver and the second optical power form by a second optical receiver. Still further, the method includes a means for converting the first optical power form into a first power output having a first power form and a second power output having a second power form.

In addition to the foregoing, other system aspects are described in the claims, drawings, and text forming a part of the present disclosure.

In addition to the foregoing, various other method and/or system and/or program product aspects are set forth and described in the teachings such as text (e.g., claims and/or detailed description) and/or drawings of the present disclosure.

The foregoing is a summary and thus contains, by necessity, simplifications, generalizations and omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

The foregoing summary is illustrative only and is not intended to be in any way limiting. In addition to the illustrative aspects, embodiments, and features described above, further aspects, embodiments, and features will become apparent by reference to the drawings and the following detailed description, of which:

FIG. 13 is an exemplary diagram of an optical power transmission system used for producing an alternating power output.

FIG. 14 is an exemplary diagram of an optical power transmission system used to drive speakers.

FIG. 15 is an exemplary diagram of an optical power transmission network.

DETAILED DESCRIPTION

Figure 1:
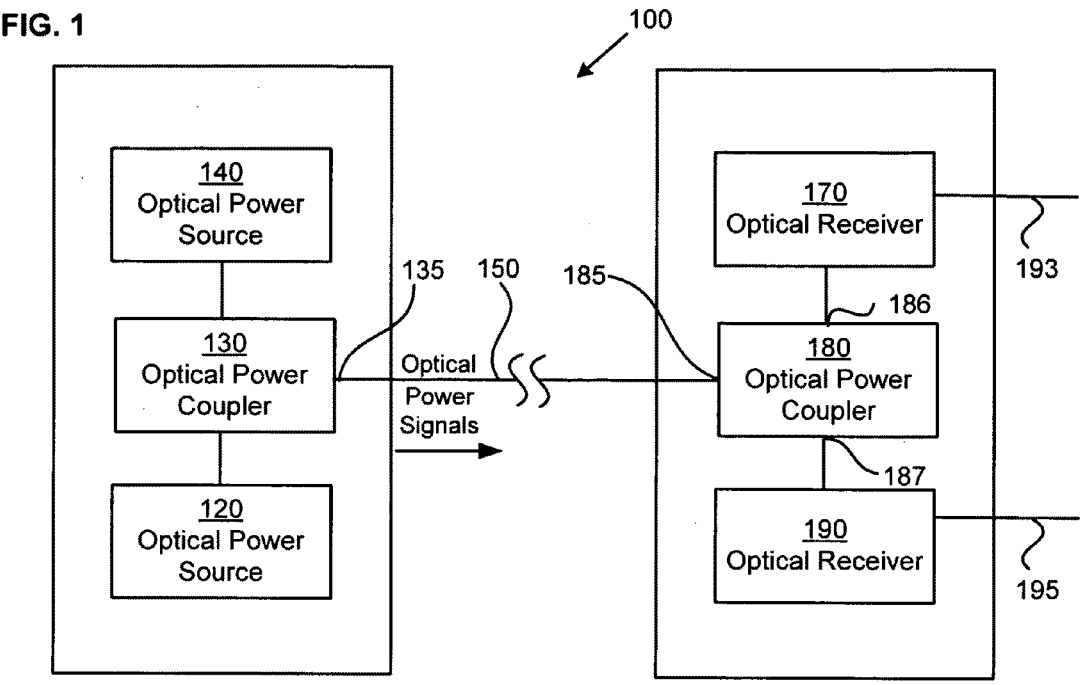
FIG. 1 is an exemplary diagram of an optical power transmission system using multiple optical power forms over an optical conduit.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Conduits for optical power may be configured for photovoltaic conversion and use at an electrical load. This may include receiving and interpreting feedback from a use-point to selectively alter the characteristics of the optical power signal or to command delivery of optical power to a particular device. An optical fiber or functional equivalent (e.g. photonic crystal fiber) may be used for conveying optical power from a source, distribution, or dispatch point to at least one location where it is to be converted into electrical power and then used without significant delay (e.g., with zero/minimal energy-storage or -buffering) to energize at-least-one electrical load, i.e., for other-than-signaling/data-transmitting purposes. Such an optical power system may be used for supplying optical power at two-or-more frequencies, or in a multiple access fashion. By controlling the optical power beam, optical power of differing polarities, phase, etc. may be provided to an electrically complex (e.g., AC or polyphase or other-than-purely-resistive) load or other loads which may be directly modulated by the optical power signal or which may demand specific power levels or specific power signal characteristics.

In one example of an advanced optical power system, it may be desirable to convert the optical power to electrical power via efficiency-optimized means, e.g., photovoltaic converters. It may also be desirable to separate optical power of differing frequencies or pulse-positions for servicing of differing components of a complex load. Further, it may be desirable to provide for electrical switchgear processing of electrical power to further condition or adapt it the power signal for at-least-one complex load.

It may also be desirable to include (quasi-) realtime feedback, on either the same or a different (optical, or other) conduit, of information pertaining to optical power-levels (or frequencies, phases, etc.) which may be desired or required. Such information may be applied so that optical power, etc. which is an input to the optical conduit at one-or-more locations distant from the load-point(s), corresponds to the optical power that is desired at the load point(s), either at the instantaneously or as forecasted or anticipated to be required at some future time, e.g., for load-following or -controlling purposes.

Further, the as-delivered optical power can be modulated with any desired frequency and waveform, such that the receiver directly outputs electrical power having the corresponding frequency and waveform, e.g., audio, RF, or microwave power, or such that the receiver outputs electrical power easily converted to a desired waveform, e.g., pulses of varying amplitude, width, or spacing which can be converted to audio-frequency power by low-pass filtering. Also, in an exemplary implementation, the as-delivered power can be converted to non-electrical forms of output power, including optical power differing in one or more characteristics from the as-delivered power, mechanical power, or thermal power. Further still, the as-delivered optical power can be converted directly into other forms of optical power by active or passive optical devices such as fluorescers, optically-pumped laser media, or optical parametric oscillators (OPOs).

In accordance with another exemplary embodiment, it may be desirable to transmit two or more forms of optical power via an optical fiber (also including but not limited to photonic crystal fiber, holey fiber, other types of optical power carrying conduit or other types of optical power transmission structures) from source end to receiver end. At receiver end, it may be desirable to convert the different optical forms to different electrical power signals. Forms of optical power may differ in mode structure, wavelength, polarization, phase, optical bandwidth, etc.

In another exemplary embodiment, it may be desirable to transmit optical power via optical fiber from source end to receiver end and simultaneously co-transmit one or more optical control signals from source end to receiver end. The control signals may differ from the power transmission in at least one of the following parameters: mode structure, wavelength, polarization, phase, optical bandwidth, etc. At the receiver end, the control signal may be used to control the conversion of the optical power signal into two or more different electrical power signals.

In yet another exemplary embodiment, it may be desirable to transmit optical power via optical fiber from source end to receiver end and simultaneously co-transmit one or more optical control signals from receiver end to source end. The optical carrier of the control signals may differ from the optical power transmission only in direction of propagation and power level or may differ in one or more of the following: wavelength, mode structure, polarization, optical bandwidth, etc. The control signal may carry information concerning the type and amount of optical or electrical power desired at the receiver end, or other information that may be sensed or otherwise determined at the receiver end. The control signal may also carry information concerning the type and amount of optical or electrical power received at the receiver end. The control signal may be used at the source end to control one or more parameters of the transmitted optical power: amplitude, amplitude-time profile, mode structure, wavelength, polarization, phase, optical bandwidth, etc. Different colors (wavelengths) polarizations, mode structures, etc. may be used to transmit multiple control signals simultaneously. Control signals may be transmitted using any of many forms of modulation know to those skilled in the art.

Referring now to FIG. 1, an exemplary optical power transmission system 100 is depicted. Optical power system 100 includes but is not limited to a first optical power source 120 providing a first optical power form and a second optical power source 140 providing a second optical power form. A first optical coupler 130 is configured to provide the first optical form and the second optical form to a common output 135 of the first optical coupler 130. A second optical coupler 180 may be configured to receive the first and second optical power forms through a common input 185 and to divide the first optical power form and the second optical power form between a first output 186 and a second output 187 of second optical coupler 180. An optical conduit 150 may be coupled to output 135 of first optical coupler 130 and input 185 to second optical coupler 180. A first optical receiver 170 may be coupled to first output 186 of second optical coupler 180 and may be configured to convert at least the first optical power form into at least one first output power form. A second optical receiver 190 may be coupled to second output 187 of second optical coupler 180 and configured to convert at least the second optical power form into at least one second output power form.

In a particular embodiment it may be desirable to have the first optical power form and the second optical power form differ in characteristic, this may include but is not limited to differing in at least one of mode structure, wavelength, polarization, optical bandwidth, etc. Optical power systems shown and described may include optical power sources which may include at least one of an electrically-powered light source, a laser, a semiconductor laser, a fiber laser, a solid-state laser, etc. In one aspect, the optical power source may include a control element that controls the optical power output in response to a control signal. In another aspect, the optical receiver may be configured to convert the one or more of the optical power forms to electrical power having at least a first electrical power form. In yet another aspect, one or more of the optical power receivers includes a control circuit configure to control the operation of an optical power converter. The optical coupler may come in a variety of forms and may be configured to be at least one of a wavelength division multiplexer (WDM), a polarization combiner, or a mode combiner.

When multiple optical power forms are used and transmitted over the same optical transmission line or optical fiber, the first output power form and the second output power form may differ in any one of frequency, polarity, phase, etc. The optical conduit or optical power carrier may include any of a variety of structures including but not limited to optical fiber, photonic crystal fiber, holey fiber, etc. The optical conduit further may be any of single mode fiber, multimode fiber, over-moded fiber, polarization maintaining fiber, etc., depending on the application and the particular design specifications.

In a particular embodiment it may be desirable to utilize the differences in received optical power forms by using the first output power form and the second output power form in a combined manner to produce at least two components of an alternating current electrical power form. In one aspect, the first optical power form and the second optical power form may differ in polarization and at least the first output power form and the second output power form may be combined to produce at least two components of a multi-phase alternating current electrical power form. In one exemplary embodiment, it may be desirable for at least one characteristic of one of the optical power sources to be adjusted based on at least one characteristic of the optical conduit. For example, at least one characteristic of one of the optical power sources may be adjusted based on at least one characteristic of the optical conduit where the optical power sources may be adjusted by at least one of wavelength, power, or polarization. Also, the at least one characteristic of the optical conduit may include at least one of transmission efficiency or maximum power handling capability. Further, it may be desirable that the characteristic on which the optical power sources are adjusted, are based on characteristics or sensed conditions of a load receiving at least some of the power. In accordance with one such exemplary embodiment, transmission efficiency and/or maximum power handling may be monitored as a function of the wavelength or alternatively as a function of polarization. Thus, the optical power source wavelength or polarization may be adjusted accordingly, in order to achieve desired results.

A system such as that depicted in FIG. 1 may be operative using one or more methodologies. For example, a method of providing power to a load coupled to the optical power system includes generating at least a first optical power form and a second optical power form. The optical power forms may have differing characteristics as defined above. Further, a method may include transmitting at least the first optical power form and the second optical power form through an optical conduit. As described above, the conduit may be any of a variety of optical power transmitting structures. On the opposite end of the optical power transmitting structure, one or more receivers maybe configured for receiving at least the first optical power form by a first optical receiver and the second optical power form by a second optical receiver. The receivers may include but are not limited to including one or more arrays of photovoltaic converters. Such converters may be configured for converting the first optical power form into a first power output having a first power form and a second power output having a second power form.

Figure 2:
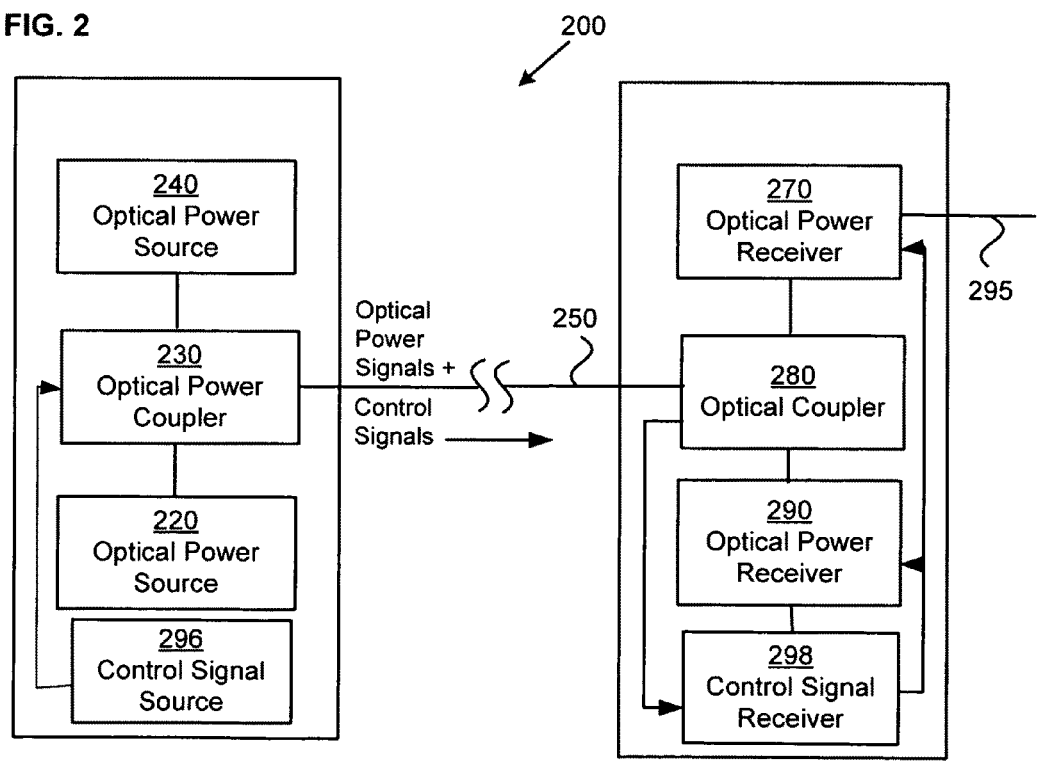
FIG. 2 is an exemplary diagram of an optical power transmission system having a co-propagating control signal over an optical conduit.

Referring now to FIG. 2, an optical power system 200 includes a first optical power source 240 providing optical power having a first optical power form. A first optical information signal source 220 provides a first optical control signal having a first optical control form. The first optical power form may be different from the first optical control form, and therefore being simply distinguished on the receiver end. A first optical coupler 230 may be configured to provide the first optical power form and the first optical control form to a common output of the first optical coupler. A second optical coupler 280 may be configured to receive the first optical power form and the first optical control signal through a common input 285. The first optical power form and the first optical control signal may be divided between a first output 286 and a second output 287 of the second optical coupler. An optical conduit 250 is coupled to first optical coupler 230 and the second optical coupler 280 and configured to transmit at least the first optical power signal and the first optical control signal therebetween. A portion of the optical power through optical coupler 280 is received by a first optical power receiver 270 which may be a photovoltaic converter or the like. A second portion of the optical power through optical coupler 280 is received by an optical receiver 290. Optical power coupler 280 may be controlled by control signal receiver 298 based on the first optical control signal. In one exemplary embodiment, a control signal source 296 may provide the control signal to optical coupler 230. Such a control signal may be an optical control signal which may be delivered over conduit 250 for controlling optical coupler 280 and the like.

In one aspect, the first optical power form and the first optical control form differ in any of a variety of ways including but not limited to mode structure, wavelength, polarization, optical bandwidth, etc. In another aspect, the first optical power source may include a control element configured to control the optical output in response to the first optical control signal. In another aspect, the first optical receiver is configured to convert the first optical power form to electrical power of at least a first electrical power form, the first electrical power form being based on the co-propagating optical control signal. In yet another aspect, the first optical receiver may includes a control circuit that may be configured to control the operation of at least one optical power converter based on the first optical control signal. For example, if a specific characteristic of electrical power signal is desired, controlling of the optical power converter may be used to produce the desired electrical power form. It may be possible to switch on and off certain portions of a photovoltaic array which could be used for constructing time varying power forms and the like. In one example, the switching device may be an opto-electrical conversion device yet in another example, the switching device may be an opto-mechanical switching device. Further, in another aspect the optical receivers may include energy storage or filtering circuitry. With such, the optical receivers may be capable of smoothing the power signals, storing at least some of the stored energy, or some combination thereof.

In one aspect, first optical coupler 230 may include at least one of a wavelength division multiplexer (WDM), a polarization combiner, or a mode combiner. The coupler is used to produce a co-propagating control signal through conduit 250 which is generally configured to deliver at least the first optical power form. In order to simply distinguish the first optical power form and the first control form, e.g. the first output power form and the first optical control form may differ in frequency, polarity, phase, etc. In further aspects, the control signals may have encoded therein at least one of but not limited to frequency information, polarity information, phase information, etc.

System 200 and the like may be utilized for the delivery of optical power using any of a variety of methods, including generating at least a first optical power having a first optical power form and a first optical control signal having a first optical control form. The optical power form is transmitted with the first optical control form through an optical conduit. A first optical receiver receives the first optical power form and a second optical receiver receives the first optical control form. The first optical power form is converted into a first power output having a first electrical power form. The electrical power form is based on the first control signal.

Figure 3:
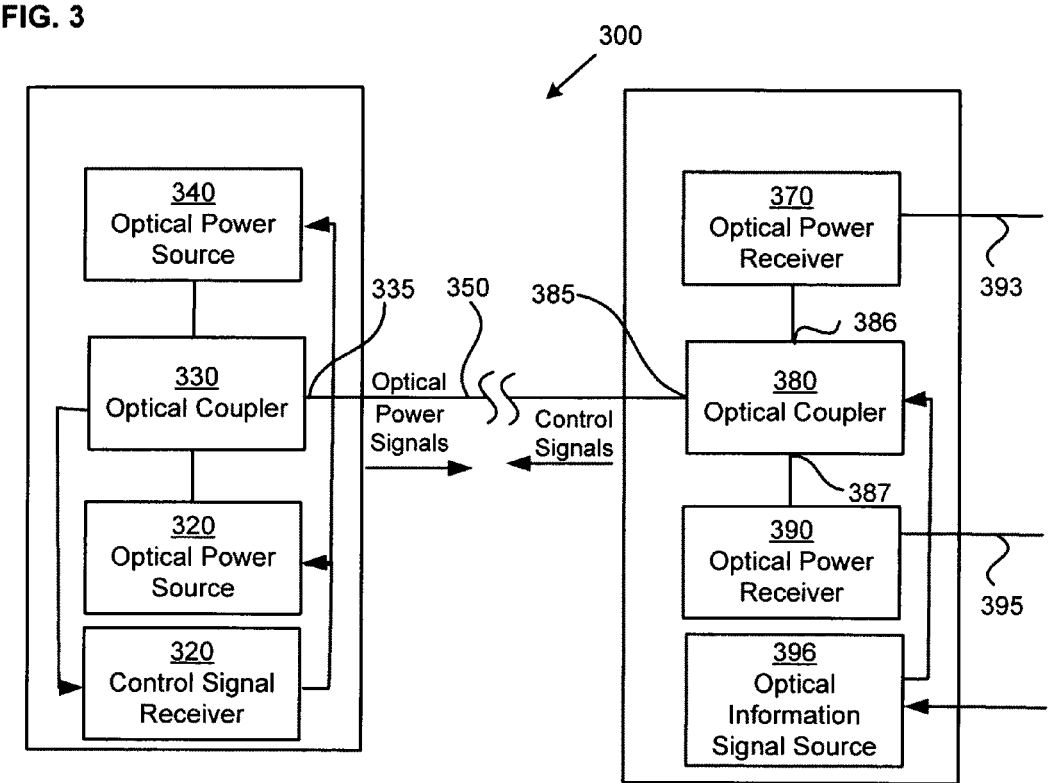
FIG. 3 is an exemplary diagram of an optical power transmission system having a counter-propagating control signal over an optical conduit.

Referring now to FIG. 3, an optical power system 300 is depicted. Optical power system 300 includes a first optical power source 340 providing at least a first optical power having a first optical power form. A first optical control signal receiver 320 may be configured to receive at least a first optical control signal. The first optical control signal has a first optical control form. The first optical power form is different from the first optical control form in order to simply distinguish the two. The first optical power form may be based on the first optical control signal. The first optical control signal is provided from a first optical information signal source 396. An optical conduit 350 is coupled to the first optical coupler 330 and the second optical coupler 380 and is configured to transmit at least the first optical power signal in one direction and the first optical control signal in the opposite direction. The optical power signal and the optical control signals may differ in a variety of ways including but not limited to mode structure, wavelength, polarization, optical bandwidth, etc. In one exemplary embodiment an optical information source 396 may provide an optical control signal to optical coupler 380. The optical control signal may be delivered over optical conduit 350 to optical power coupler 330 for use thereby, or to be distributed for other uses. The optical control signal may be used to control optical coupler 380 and optical power sources 320 and 340. Optical coupler 380 determines how the optical power will be distributed to optical power receivers 370 and 390.

In one aspect, the first optical power source may include a control element that is configured to control the optical output in response to the first optical control signal. In another aspect, the first optical receiver may be configured to convert the first optical power form to electrical power of at least a first electrical power form, for example, the control signal may be configured to control the at least one optical power converter. In a further aspect, at least one characteristic of one of the optical power sources is adjusted based on at least one characteristic of a load coupled to at least the first optical power receiver. The load may be configured with a sensor to sense a load condition and provide feedback to the control system. The control circuit may be configured with a control algorithm which may include but is not limited to any of a variety of applicable control algorithms such as at least one of classical control, linear control, nonlinear control, adaptive control, multivariable control, optimal control, intelligent control, fuzzy control, neural control, stochastic control, or look up table control. The Control signal may include any of a variety of information including but not limited to frequency information, polarity information, phase information, duty cycle information, etc.

System 300 may be applicable to a method of transmitting power. The method may include generating at least a first optical power having a first optical power form minimally through the use of a transceiver 340 which includes an optical power source. At least a first optical control signal having a first optical control form is generated and at least the first optical power form and the first optical control form are transmitted through an optical conduit in opposite directions. The method further includes receiving at least the first optical power form by a first optical receiver and the first optical control form by a second optical receiver and converting the first optical power form into a first power output having a first electrical power form, the electrical power form being based on the first control signal.

Figure 4:
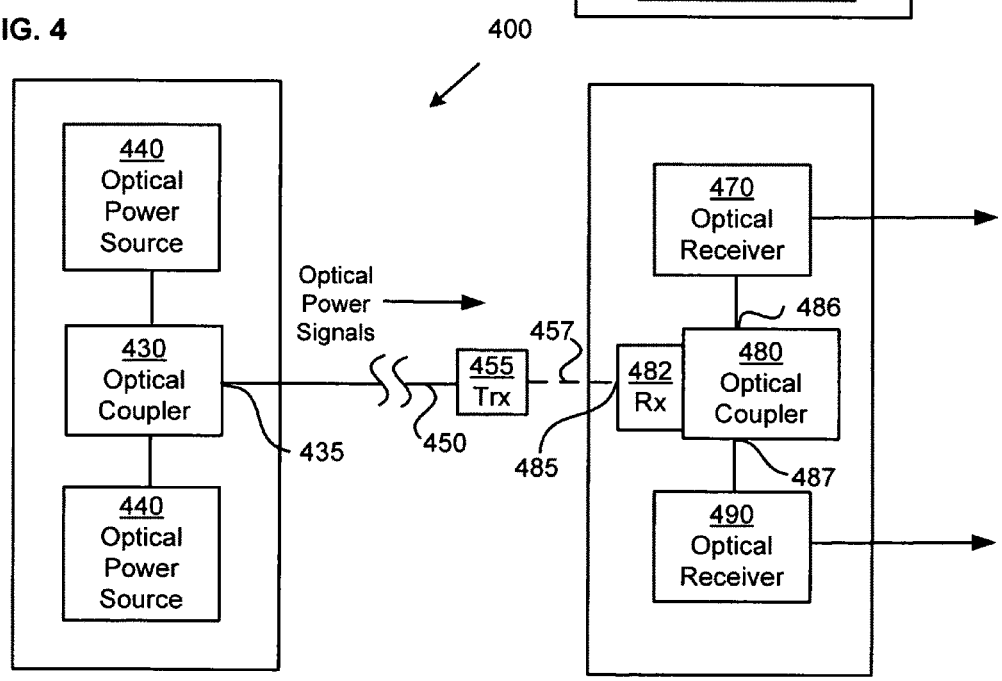
FIG. 4 is an exemplary diagram of an optical power transmission system having multiple optical power forms and using partial free-space transmission.

Referring now to FIG. 4, an exemplary optical power system 400 includes a first optical power source 420 providing a first optical power form and a second optical power source 440 providing a second optical power form. A first optical coupler 430 may be configured to provide the first optical form and the second optical form to a common output 435 of first optical coupler 430. A second optical coupler 480 may be configured to receive the first and second optical power forms through a common input 485 and divide the first optical power form and the second optical power form between a first output 486 and a second output 487 of second optical coupler 480. A free space transmitter 455 may be coupled to the first optical coupler for transmitting the first optical power form and the second optical power form over free space 457 for a distance. A free space collector 482 may be configured to receive the first optical power form and the second optical power form and to provide the optical power forms to second optical coupler 480. The generalized system 400 may have characteristics and capabilities similar to those systems shown and described in other portions of the disclosure.

System 400 may be applied to carry out a method of transmitting power. Such a method may generally include generating at least a first optical power form and a second optical power form by optical power sources 420 and 440. At least the first optical power form and the second optical power form may be transmitted at least partially or entirely over free space. The first optical power form may be received by first optical receiver 470 and the second optical power form may be received by second optical receiver 490. The first optical power form may be converted into a first power output having a first power form and a second power output having a second power form.

Figure 5:
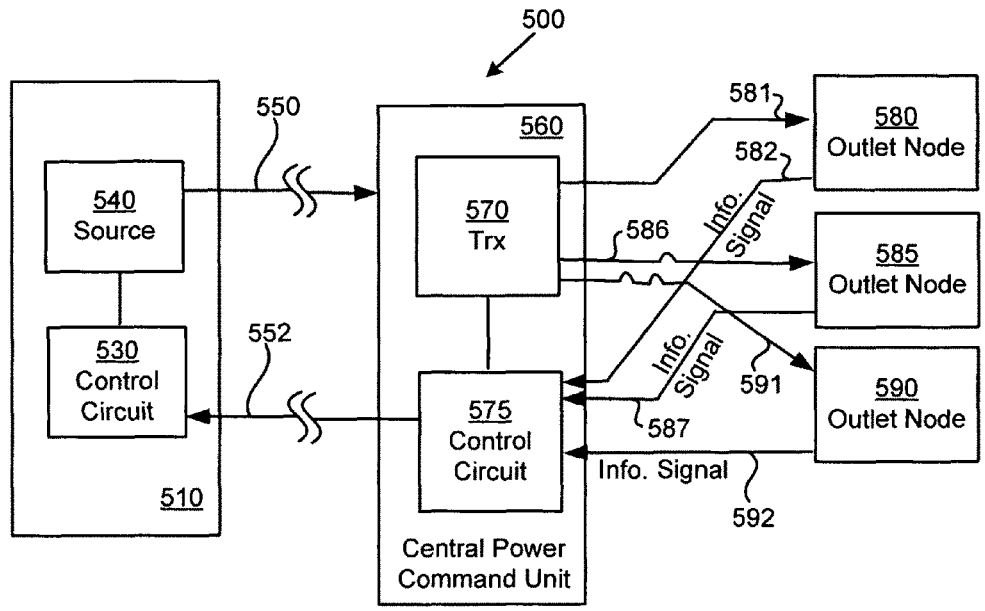
FIG. 5 is an exemplary diagram of an optical power distribution system.

Referring now to FIG. 5, an optical power distribution system 500 includes generally an optical power source 540. Distribution system 500 also includes more than one optical power outlet node depicted as nodes 580, 585, and 590. An optical power switching unit (or central power command unit) 560 may be coupled to the optical power source and may be configured to receive optical power from the optical power source via optical conduit 550. Optical power switching unit 560 may be configured to change the characteristics of the received optical power and to selectively provide optical power to one or more of the optical power outlet nodes. In accordance with an exemplary embodiment, one or more nodes 580, 585, 590 may request optical power over communication lines 582, 587, and 592 respectively. Control circuit 575 determines a scheme for providing the required power to the outlet nodes per the request or in a manner in which to best fulfill the requests. Information signals carried over lines 582, 587, and 592 are provided to control circuit 575 which provides an information signal to control circuit 530 via upstream conduit 552, in order to control the output of power source 540.

In accordance with an exemplary embodiment, optical power switching unit 560 may be configured to selectively provide a portion of the optical power to selected optical power outlet nodes. It may also be desirable that optical power switching unit 560 may deliver a percentage of optical power to one or more of outlet nodes 580, 585, and 590 in accordance with commands from control circuit 575.

In one aspect, system 500 may include a termination node which may be represented as any of the outlet nodes of system 500. The termination unit is configured to accept and dispose of excess power provided to the system. In another aspect, an optical conduit coupling the optical power source and the optical power outlet nodes may carry both the optical power signal and optical control signals. Further, the switching unit may include beam splitting nodes.

An optical power distribution system 500 may also be configured with an optical power source 540 and more than one optical power outlet node 580, 585, and 590. At least one optical power outlet node may include a transmitter configured to communicate information related to the characteristics of the optical power needed at the at least one optical power outlet node. An optical power switching unit may be coupled to the optical power source and receives optical power from the optical power source. The optical power switching unit may be configured to change the characteristics of the received optical power based on the information received from the at least one optical power outlet node and to selectively provide optical power to one or more of the optical power outlet nodes substantially in accordance with the characteristics of the optical power needed.

System 500 may be used for a method of distributing optical power. Such a method may include generally providing optical power from optical power source 540 to optical power switching unit 560. The method may also include receiving a request for optical power from an optical power outlet node and converting the optical power from the optical power source to an optical power form in accordance to the request. The optical power form is delivered to the requesting optical power outlet node.

Figure 6:
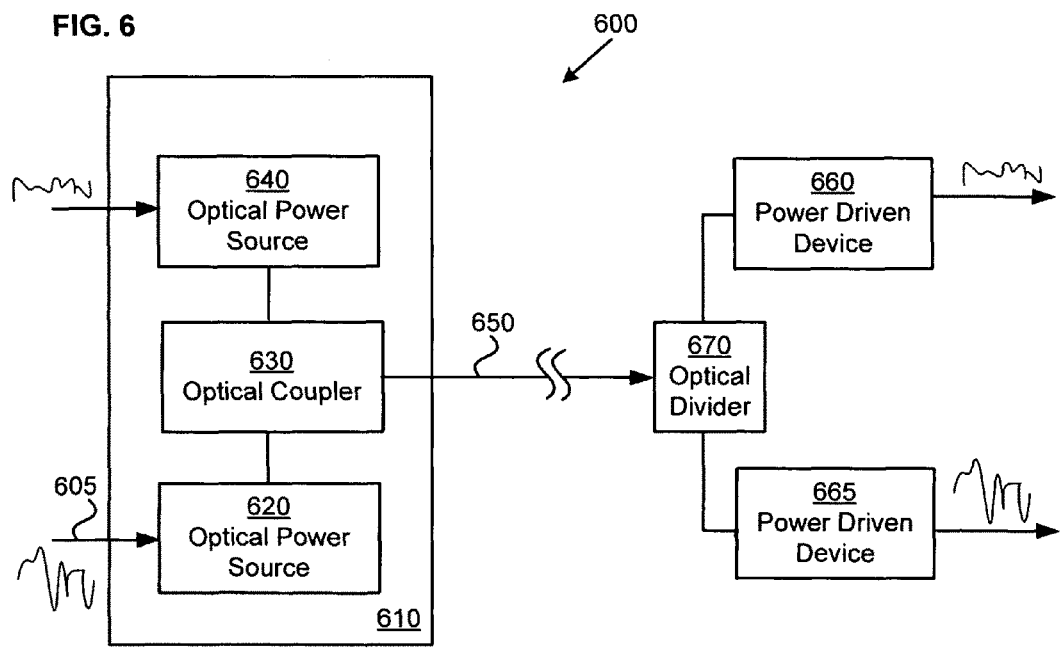
FIG. 6 is an exemplary diagram of an optical power transmission system having an optical power driven device coupled directly thereto.

Referring now to FIG. 6, an optical power system 600 includes a first electrical device 610 configured to receive electrical power 605 and to convert the electrical power into at least a first optical power form using optical power source 620 and a second optical power form produced by a second optical power source 640. The first optical power form may be different than the second optical power form. The first optical power form may be modulated and the second optical power form may also be modulated. An optical coupler may provide the two optical power forms over an optical conduit 650 to an optical divider 670 which divides the two optical power forms and delivers the two optical power forms to a first power driven device 660 which is driven by the modulated optical power signal to provide output and to a second optical power driven device 665. An optical conduit may be coupled to the optical coupler and may be configured to transmit at least the first modulated optical power form and the second optical power form to optical divider 670.

In one aspect the output may be based on the first modulated optical power form. In accordance with exemplary embodiments, the modulating is carried out using at least one of an amplitude modulator, a frequency modulator, a phase modulator, a polarization modulator, etc.

In one exemplary embodiment, the first electrical device includes at least one of a speaker, an antenna, a display, a mechanical device, etc.

A method of transmitting power may also be carried out in the aforementioned system by receiving electrical power by a first electrical device configured to receive electrical power and converting the electrical power into at least a first optical power form and a second optical power form. The method also includes modulating the first optical power form with an information signal or variable signal to form a first modulated optical power form. Further, the method includes transmitting at least the first modulated optical power form and the second optical power form through an optical conduit. Further still, the method includes receiving at least the first modulated optical power form by a second electrical device and driving the output of the second electrical device by the modulated optical power signal.

Figure 7:
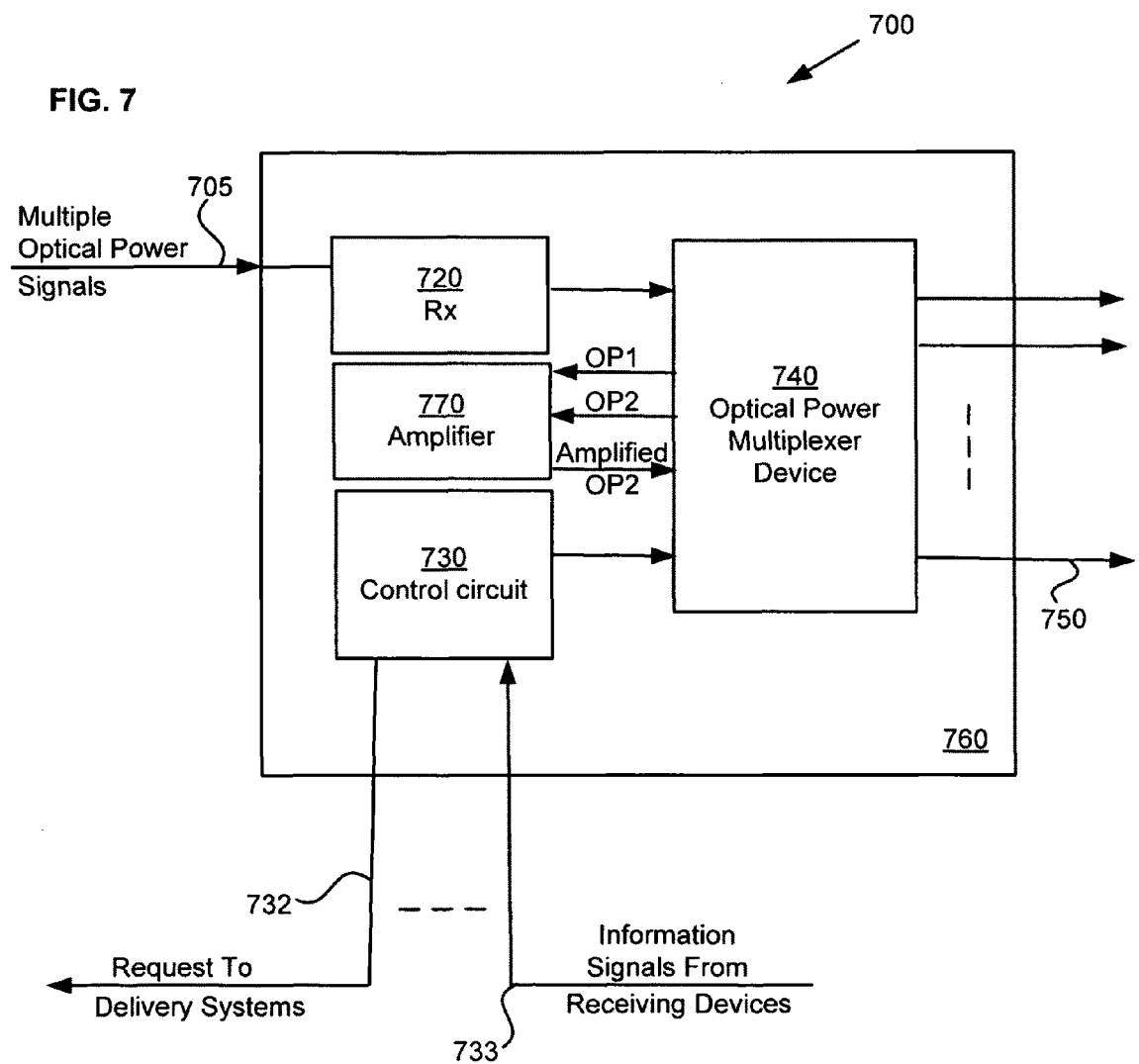
FIG. 7 is an exemplary diagram of an optical power transmission system utilizing a control circuit.

Referring now to FIG. 7, an optical power distribution device 700 is depicted. Device 700 includes an optical power receiver configured to receive one or more optical power signals 705 from one or more optical power sources. Device 700 also includes an optical power multiplexing device 740 that is configured to receive one or more optical power signals from the receiver and may be configured to distribute the received optical power signals selectively among more than one output 750. A control circuit may be configured to provide signals to the optical power multiplexing device representative of the optical power output distribution desired. Device 700 may be but is not limited to being in an independent electronic package 760 which may be used as an individual component in an optical power system.

In one aspect, the optical power multiplexer may include, but is not limited to including any of a wavelength division multiplexer (WDM), a dense-wavelength division multiplexer (DWDM), an opto-electronic converter, etc. In another aspect, device 700 may includes any of an optical amplifier 770, an erbium-doped fiber amplifier, a semiconductor optical amplifier, a Raman amplifier, an optical parametric amplifier, a quantum dot semiconductor optical amplifier. Amplifier 770 may receive optical power forms (OP1 and OP2) from multiplexer 740 and may deliver an amplified optical power form OP2 back to multiplexer 740 for distribution. Further, device 700 may include in optical multiplexer 740 a beam separator, an adjustable beam separator, an optical power attenuator, etc.

Control circuit 730 may provide a signal representative of the percentage of power to be output for a specified output of the optical power multiplexer device, provide a signal representative of the wavelength of the optical power signal to be output for a specified output of the optical power multiplexer device, provide a signal representative of the polarization of the optical power signal to be output for a specified output of the optical power multiplexer device, provide a signal representative of the mode structure of the optical power signal to be output for a specified output of the optical power multiplexer device, provide a signal representative of the frequency of the optical power signal to be output for a specified output of the optical power multiplexer device, or provide a signal representative of the phase of the optical power signal to be output for a specified output of the optical power multiplexer device.

Control circuit 730 may also be configured to receive requests 732 from the optical power source, the requests being related to the output distribution desired, or configured to receive requests 733 from one or more optical power receiving devices, the requests being related to the output distribution desired.

Figure 8:
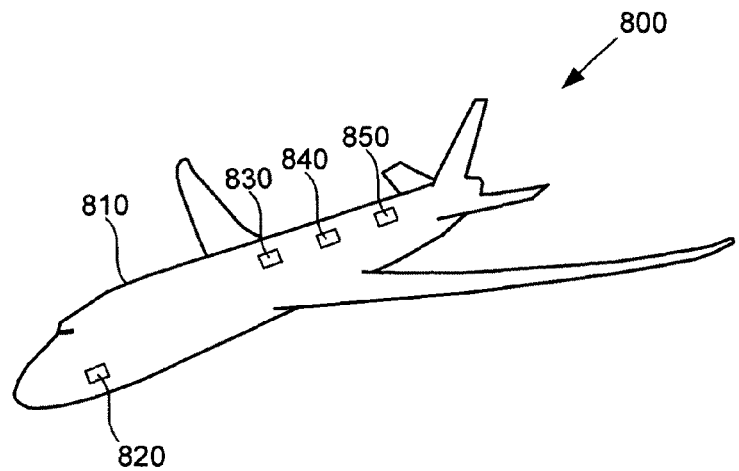
FIG. 8 is an exemplary diagram of an optical power transmission system on board an aircraft.

Referring now to FIG. 8, an aircraft 800 includes an optical power distribution system within fuselage 810. Optical power distribution system may include an optical power source 820. The optical power distribution system may also include more than one optical power outlet node 840 and 850 are configured on board the vehicle. An optical power switching unit 830 may be coupled to optical power source 820 and receives optical power from optical power source 820. Optical power switching unit 830 may be configured to selectively provide optical power to optical power outlet nodes 840 and 850. An optical conduit couples optical power switching unit 830 to the optical power nodes 840 and 850. Because multiple power signals may be sent over the optical conduits in the optical power distribution described, using an optical power distribution on board a vehicle has the advantage of saving weight and thereby providing a potential fuel savings. Such vehicles may include but are not limited to an aircraft, an airplane, a watercraft, a ship, a land-based vehicle, a bus, a train, etc.

Figure 9:
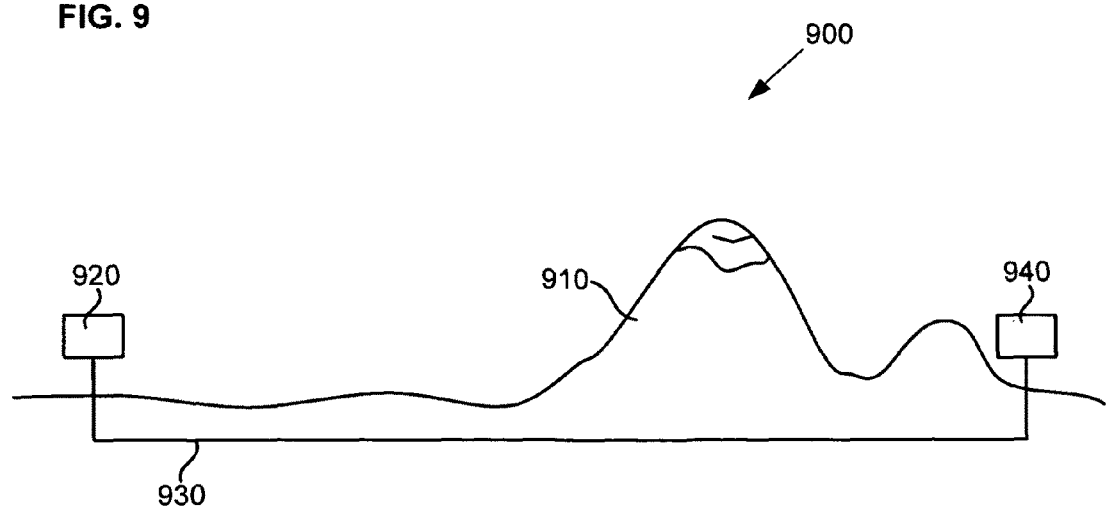
FIG. 9 is an exemplary diagram of an optical power transmission used for delivering power over a long distance.

Referring now to FIG. 9, an exemplary optical power transmission system 900 is depicted. Transmission system 900 is designed to carry multiple optical power forms over a distance 910 which may include over land, under water, over water, or underground, or any combination thereof. System 920 includes one or more optical power sources 920 which provides multiple optical power forms over an optical conduit 930. Optical conduit 930 may be any type of optical conduit as earlier discussed and additionally may include free-space. Optical conduit 930 is coupled to an optical power receiving unit 940 which may include multiplexing devices and may also include optical power conversion devices.

Figure 10:
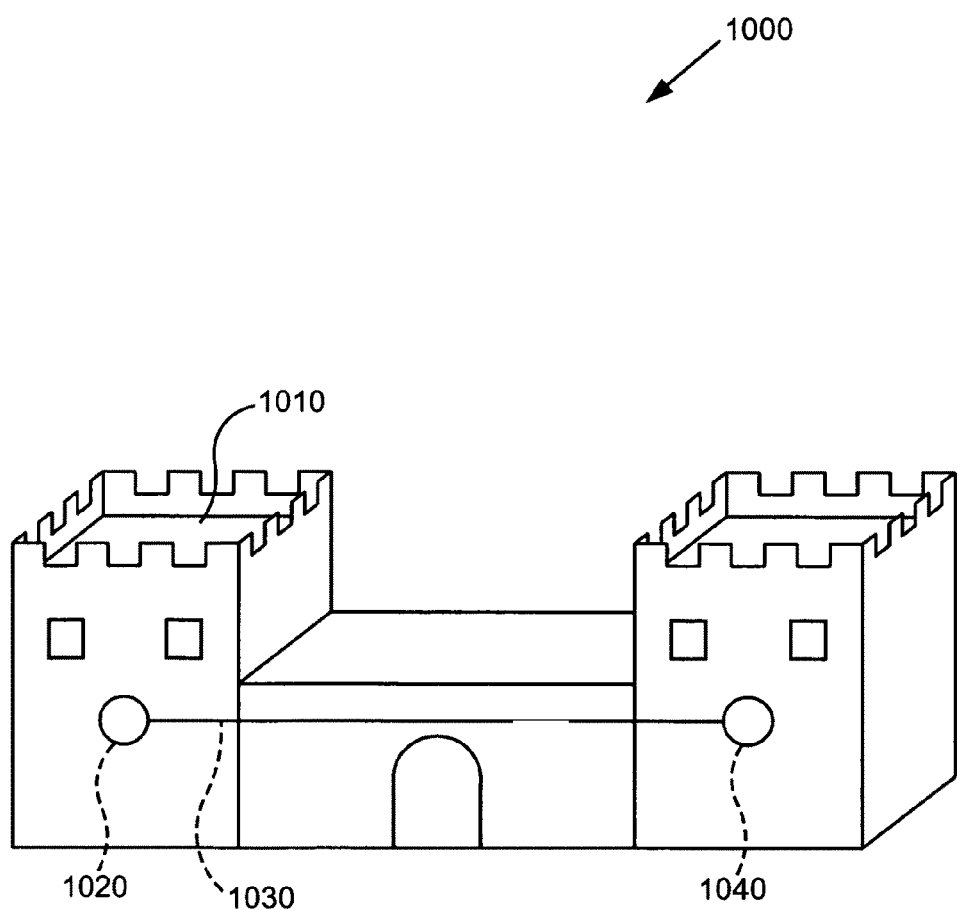
FIG. 10 is an exemplary diagram of an optical power distribution system being configured to be used in a building.

As depicted in FIG. 10 a system 1000 may be retrofitted to a building, especially to buildings, such as castle 1010 where it may not be easy or may be impossible to run conventional wiring through walls. Using the optical power systems as described, may have the advantage of requiring less optical conduit 1030 to be run (as compared with conventional wiring) from optical power sources 1020 to outlet nodes 1040 throughout the building.

An exemplary method of transmitting power which may be applicable to any of the systems shown and described may include providing more than one optical power transmission station including an optical power receiever and an optical power transmitter. The method may also include transmitting optical power from at least one optical power transmission station having a first free-space transceiver and receiving optical power from at least one optical power transmission station including a second free-space transceiver and creating a free-space conduit with the free-space transceiver. The method may also include receiving one or more optical power requests over the free-space conduit by an optical power control unit.

Figure 11:
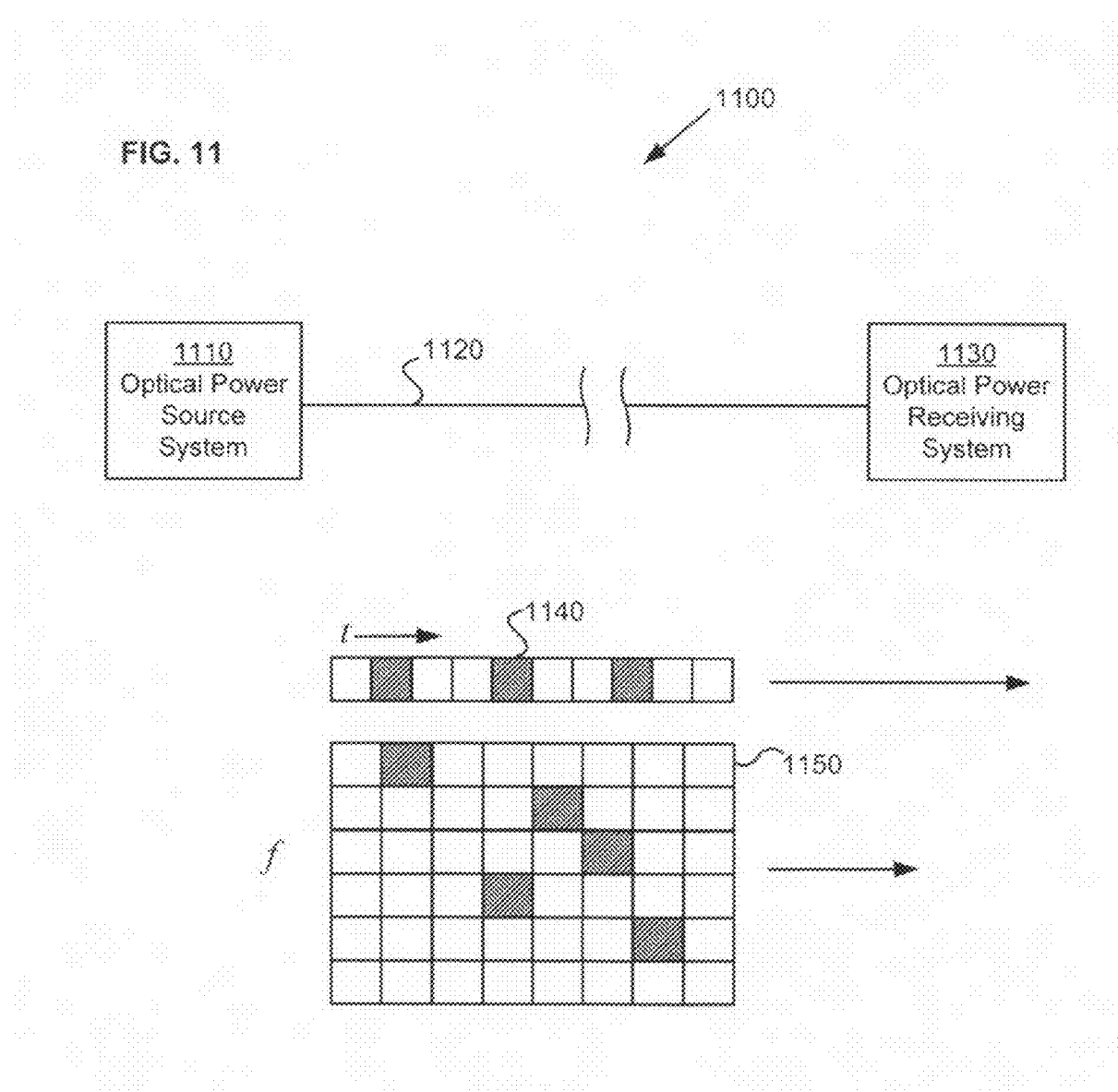
FIG. 11 is an exemplary diagram of an optical power transmission system utilizing power packeting methods.

Referring now to FIG. 11, an optical power transmission system 1100 includes an optical power source 1110. An optical power receiver 1130 may be configured to receive optical power from the optical power source. An optical conduit 1120 couples optical power source 1110 to optical power receiver 1130 An optical power processing unit, which may be incorporated into optical power source system 1110, may be configured to control the output of the optical power source by packeting the optical power signal for use in a multiple power access methodology. In one example, the multiple access methodology includes at least one of a frequency-based multiple access methodology 1150, a frequency division multiple access (FDMA) methodology, a code-based multiple access methodology, a time-based multiple access methodology, a time division multiple access (TDMA) methodology 1140, etc.

In another aspect, an optical power transmission system includes an optical power source. A first optical power node is coupled to the power source and a second optical power node is also coupled to the power source. An optical conduit couples the optical power source to the first optical power node and the second optical power node. The first optical powered node and the second optical powered node including controllers configured to accept or reject optical power packets based on information transmitted over the optical conduit and based on a multiple power access methodology.

Figure 12:
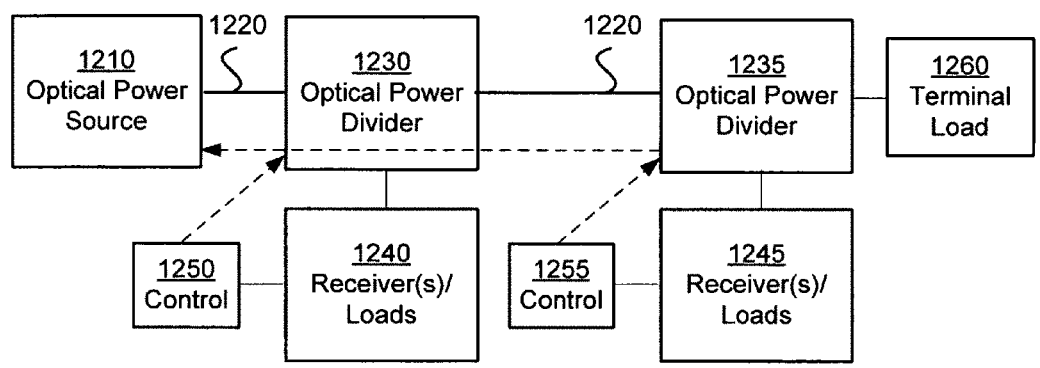
FIG. 12 is an exemplary diagram of an optical power transmission system utilizing multiple optical power dividers and optical power receivers or loads.

Referring now to FIG. 12, an optical power distribution system 1200 is depicted. Optical power distribution system 1200 includes an optical power source 1210. System 1200 also includes more than one optical power outlet node which may include a power divider 1230 a power receiver or load 1240 and a control 1250. Similarly another node may include a divider 1235, receiver/load 1245, and control 1255. Optical power divider 1230 may be coupled to optical power source 1210 and may receive optical power from optical power source 1210. Optical power divider 1230 may be configured to selectively provide a selected portion of the optical power from the optical power source to one or more of the optical power outlet nodes or loads. In an exemplary embodiment, the dividers may be part of the optical power outlet nodes or may be a separate component.

In system 1200 or other optical power distribution systems, receivers, loads, or optical power outlet nodes may all be referred to as optical sinks. Thus, an optical sink may be a final outlet port for optical power or may be an intermediate node in a distribution network. In an exemplary embodiment, a sink may provide information about what is needed by the sink itself or what may be needed by network nodes downstream of the particular sink. A controller may transmit such information back to the source, to distribution nodes, or to other optical sinks.

In an exemplary embodiment multiple sources may provide different optical power forms, e.g. the wavelengths may differ. These multiple power forms may be transmitted over the same or different optical conduits. In an exemplary embodiment, a controller may help in determining what power source the optical power comes from. This may be based on the efficiencies or characteristics of the optical power form and how the power will be ultimately used.

Nodes in the distribution networks shown and described may include more than one input port. Thus, if one source or conduit running to one input port fails, the power may be delivered to the node over another conduit through a redundant input port. Additional input ports may be used to supply additional optical power to a distribution node or sink, or to provide optical power in additional forms, such as different wavelengths or pulse formats. Further, additional input ports may be used to provide redundancy in power distribution.

In another exemplary embodiment an optical power subsystem may include various elements including but not limited to an optical power divider, an optical power receiver, and a controller designed to control the division of optical power by the divider based on information received by the controller. Such a subsystem may provide power to optical sinks or may be an optical sink itself.

In one aspect, the optical power divider may be configured to selectively provide a portion of the optical power to selected optical power outlet nodes in response to a control signal from at least one of the optical power outlet nodes. In another aspect the optical power divider may be configured to selectively provide a portion of the optical power to selected optical power outlet nodes in response to a control signal from a terminal load coupled to the optical power source. In yet another aspect, the system includes multiple optical power dividers with multiple optical power outlet nodes coupled to the dividers and each of the optical power outlet nodes communicates optical power demands to the optical power source. In still yet another aspect, the system includes multiple optical power dividers with multiple optical power outlet nodes coupled to the dividers and each of the optical power outlet nodes communicates optical power demands to each of the other optical power dividers.

System 1200 may also include a central controller configured to provide control signals to the switching unit and the control unit receiving command signals from at least one of the optical power outlet nodes. Further, system 1200 may include a termination unit configured to accept and dispose of excess power provided on the circuit.

In still yet another aspect, the more than one optical power divider may be coupled to the more than one optical power source and may receive optical power from the more than one optical power source. The optical power divider may be configured to divide the optical power from the more than one optical power source based on the information received from the at least one optical power outlet node and may selectively provide optical power to one or more of the optical power outlet nodes substantially in accordance with the demands of the optical power needed at each optical power outlet node. The more than one optical power source may receive information from the optical power outlet nodes. The received information may be used to control the optical power being delivered from the more than one optical power source.

Referring now to FIG. 13, an Optical Power System configured to provide an alternating power output. An optical power source A 1340 and an optical power source B 1320 receive Power inputs 1324 and 1322 respectively. A time varying control signal 1312 is divided such that optical power source A 1340 receives the positive half control signal 1313 and optical power source B 1320 receives the negative half control signal 1312. Optical power source A 1340 and optical power source B 1320 provide optical power forms to optical power coupler 1330 which sends optical power signals over conduit 1350 through an outlet 1335 to an input of optical coupler 1380 which divides the power forms between optical receiver 1370 and optical receiver 1390. Combined power output of Optical receivers 1370 and 1390 is provided at Power Out 1384. As the signals are combined a sinusoidal output may be reconstructed. In alternative embodiments other types of time varying power outputs may be formed not limited to the sinusoidal output depicted as an example. For example, square waves, triangle waves or other periodic or aperiodic waveforms may be created.

Referring now to FIG. 14, an optically powered stereo speaker system 1400 is depicted. Speaker system 1400 includes an optical power source 1440 and an optical power source 1420, which receive left and right stereo audio signals respectively (or alternatively other types of modulated signals). An optical coupler 1430 combines the optical power from optical power source 1420 and optical power source 1440 to be transmitted over optical conduit 1450. An optical power coupler 1450 receives optical power from conduit 1450 and divides the optical power back into a right and left channel. A left channel photovoltaic converter 1460 and a right channel photovoltaic converter 1465 convert the incoming optical power signals to electrical signals which directly drive left speaker 1470 and right speaker 1475 respectively. In accordance with alternative embodiments, speakers 1470 and 1475 may be replaced with other loads which are to be driven directly with the modulated power signals.

Referring now to FIG. 15 a modular optical power network 1500 is depicted. Network 1500 includes a plurality of network nodes including but not limited to nodes 1510, 1511, 1512, 1513, and 1514. Each of nodes 1510, 1511, 1512, 1513, and 1514 are in communication with communication network 1540 which may be a telephone network, a wireless network, the internet, or any other dedicated or general purpose communication network. Each of nodes 1510, 1511, 1512, 1513, and 1514 include control units 1520, 1521, 1522, 1523, and 1524 respectively, which receive information signals from network 1540. Each of nodes 1510, 1511, 1512, 1513, and 1514 include distribution nodes 1550, 1551, 1552, 1553, and 1554 respectively. The distribution nodes may include one or more optical power inlets and one or more optical power outlets, each of which may be coupled to other distribution nodes or to any of a variety of loads, such as but not limited to loads 1570, 1571, and 1572, and terminal load 1580. Network 1500 may include any number or configuration of nodes 1510, 1511, 1512, 1513, and 1514 or other nodes. Control of one or more of nodes 1510, 1511, 1512, 1513, and 1514 may be controlled over network 1540 as to the distribution of optical power received by each distribution node. By having a modular network such as system 1500, many configurations and applications may be made using nodes such as nodes 1510, 1511, 1512, 1513, and 1514.

Figure 16:
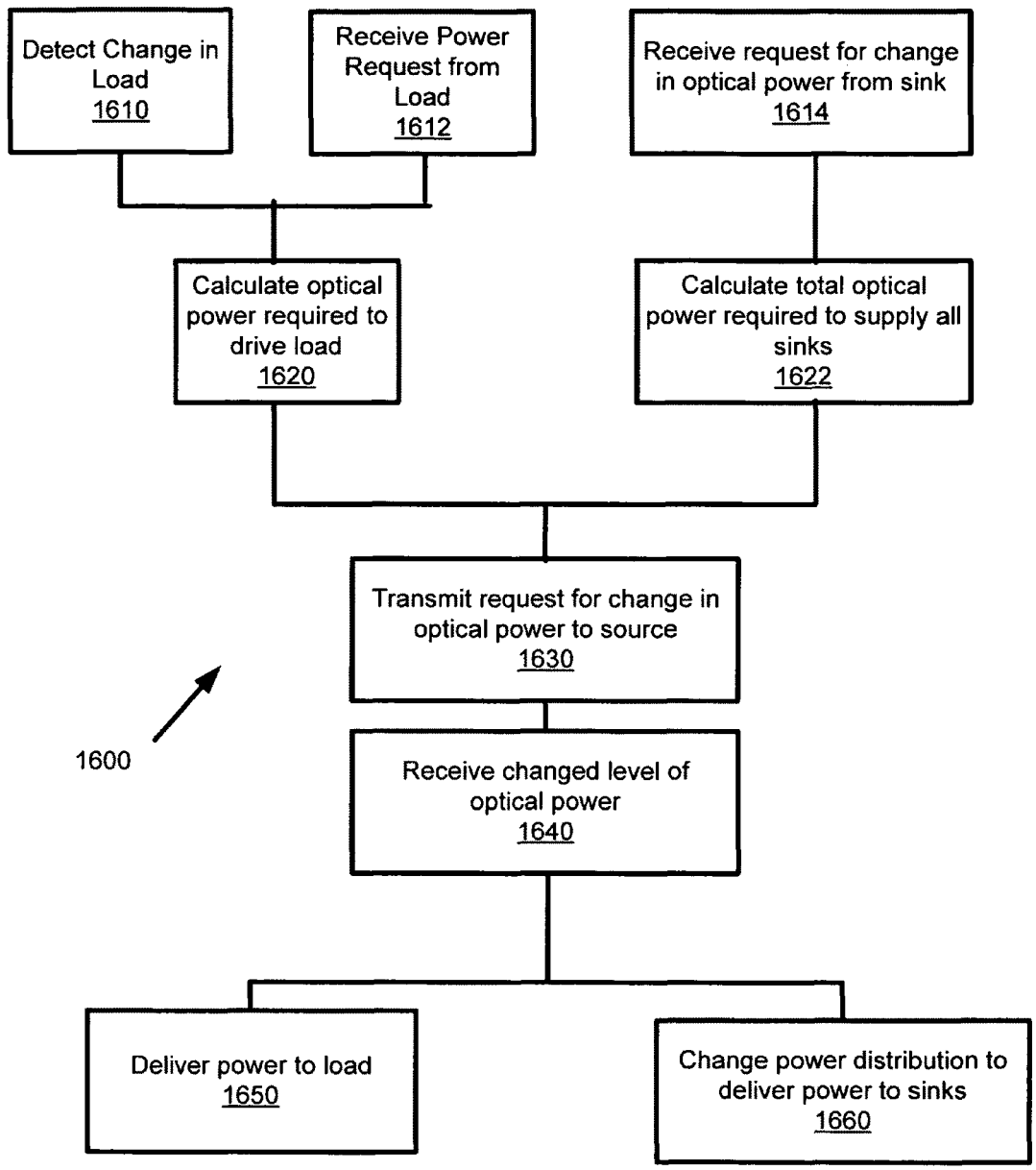
FIG. 16 is an exemplary process diagram for delivering optical power over a distribution network.

Referring Now to FIG. 16, a method 1600 for delivering optical power over a distribution network is depicted. The left hand path of process 1600 illustrates the method with respect to a power outlet node (i.e., an edge node of the network), and includes detecting the change in a load (process 1610) via any type of observational method including but not limited to sensors and the like. Alternatively, process 1600 includes receiving a power request from the load (process 1612). The optical power required to drive the load may be calculated or otherwise determined (process 1620). In an alternative path, suited to a power distribution node (i.e., an internal node of the network) a request for a change in optical power may be received from one of the optical sinks (process 1614) coupled to the node. The total optical power required to supply all the sinks attached to that node may then be calculated or otherwise determined (process 1622). In either case, a request for change in optical power may then be transmitted from that node to one or more optical power sources connected to the node (process 1630). The changed level of optical power is received by one or more of the power inputs of the node (process 1640). Power may then be delivered to one or more loads (process 1650) or alternatively the power distribution may be changed to be delivered to one or more optical sinks (process 1660). If the correct level of optical power is not received for any reason, the node may either request additional changes (1630), e.g. from a different optical power source, or, if attached to two or more loads and/or sinks, may reallocate power among the attached loads and/or sinks according to a rule or any of a variety of applicable algorithms.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.). Further, those skilled in the art will recognize that the mechanical structures disclosed are exemplary structures and many other forms and materials may be employed in constructing such structures.

In a general sense, those skilled in the art will recognize that the various embodiments described herein can be implemented, individually and/or collectively, by various types of electro-mechanical systems having a wide range of electrical components such as hardware, software, firmware, or virtually any combination thereof; and a wide range of components that may impart mechanical force or motion such as rigid bodies, spring or torsional bodies, hydraulics, and electro-magnetically actuated devices, or virtually any combination thereof. Consequently, as used herein "electro-mechanical system" includes, but is not limited to, electrical circuitry operably coupled with a transducer (e.g., an actuator, a motor, a piezoelectric crystal, etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), electrical circuitry forming a communications device (e.g., a modem, communications switch, or optical-electrical equipment), and any non-electrical analog thereto, such as optical or other analogs. Those skilled in the art will also appreciate that examples of electro-mechanical systems include but are not limited to a variety of consumer electronics systems, as well as other systems such as motorized transport systems, factory automation systems, security systems, and communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those skilled in the art will recognize that it is common within the art to implement devices and/or processes and/or systems in the fashion(s) set forth herein, and thereafter use engineering and/or business practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, hovercraft, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Quest, Southwestern Bell, etc), or (g) a wired/wireless services entity such as Sprint, Cingular, Nextel, etc.), etc.

One skilled in the art will recognize that the herein described components (e.g., steps), devices, and objects and the discussion accompanying them are used as examples for the sake of conceptual clarity and that various configuration modifications are within the skill of those in the art. Consequently, as used herein, the specific exemplars set forth and the accompanying discussion are intended to be representative of their more general classes. In general, use of any specific exemplar herein is also intended to be representative of its class, and the non-inclusion of such specific components (e.g., steps), devices, and objects herein should not be taken as indicating that limitation is desired.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. An optical power system, comprising:
 at least one optical power source providing at least two different optical power forms;
 a first optical coupler configured to provide the first optical form and the second optical form to a common output of the first optical coupler;
 a second optical coupler configured to receive the first and second optical power forms through a common input and divide the first optical power form and the second optical power form between a first output and a second output of the second optical coupler;
 a free space transmitter coupled to the first optical coupler for transmitting the first optical power form and the second optical power form over free space for a distance; and a free space collector configured to receive the first optical power form and the second optical power form and to provide the optical power forms to the second optical coupler;

a first optical receiver coupled to the first output of the second optical coupler and configured to convert at least the first optical power form into at least one first output power form; and a second optical receiver coupled to the second output of the second optical coupler and configured to convert at least the second optical power form into at least one second output power form;

wherein the first output power form and the second output power form are used to produce at least two components of an alternating current electrical power form, and wherein the alternating current electrical power form includes a multi-phase alternating current electrical power form.

2. The system of claim 1, wherein the first optical power form and the second optical power form differ in mode structure.

3. The system of claim 1, wherein the first optical power form and the second optical power form differ in wavelength.

4. The system of claim 1, wherein the first optical power form and the second optical power form differ in polarization.

5. The system of claim 1, wherein the first optical power form and the second optical power form differ in optical bandwidth.

6. The system of claim 1, wherein the first optical power source includes at least one electrically-powered light source.

7. The system of claim 1, wherein the first optical power source includes at least one laser.

8. The system of claim 1, wherein the first optical power source includes at least one semiconductor laser.

9. The system of claim 1, wherein the first optical power source includes at least one fiber laser.

10. The system of claim 1, wherein the first optical power source includes at least one solid-state laser.

11. The system of claim 1, wherein the first optical power source includes a control element configured to control the optical output in response to a control signal.

12. The system of claim 1, wherein the first optical receiver is configured to convert the first optical power form to electrical power of at least a first electrical power form.

13. The system of claim 1, wherein the first optical receiver includes a control circuit configure to control the operation of at least one optical power converter.

14. The system of claim 1, wherein the first optical coupler includes at least one of a wavelength division multiplexer (WDM), a polarization combiner, or a mode combiner.

15. The system of claim 1, wherein the first electrical power form and the second electrical power form differ in frequency.

16. The system of claim 1, wherein the first electrical power form and the second electrical power form differ in polarity.

17. The system of claim 1, wherein the first electrical power form and the second electrical power form differ in phase.

18. The system of claim 1, wherein at least one characteristic of one of the optical power sources is adjusted based on at least one characteristic of a load coupled to at least one of the first and second optical power receivers and the at least one characteristic of the load is sensed by a sensor configured to sense the at least one characteristic of the load.

19. The system of claim 1, further comprising: an optical conduit coupled between the first optical coupler and the free space transmitter.

20. The system of claim 19, wherein the optical conduit includes an optical fiber.

21. The system of claim 19, wherein the optical conduit includes a photonic crystal fiber.

22. The system of claim 19, wherein the optical conduit includes a holey fiber.

23. The system of claim 1, further comprising: an optical conduit coupled between the second optical coupler and the free space collector.

24. The system of claim 1, wherein the first optical coupler and the free space transmitter are integrated.

25. The system of claim 1, wherein the second optical coupler and the free space collector are integrated.

26. A method of transmitting power, comprising:

generating at least a first optical power form and a second optical power form;

transmitting at least the first optical power form and the second optical power form at least partially over free space;

receiving at least the first optical power form by a first optical receiver and the second optical power form by a second optical receiver; and converting the first optical power form into a first power output having a first power form and a second power output having a second power form;

wherein the first power form and the second power form are used to produce at least two components of an alternating current electrical power form, and wherein the alternating current electrical power form includes a multi-phase alternating current electrical power form.

27. The method of claim 26, wherein the first optical power form and the second optical power form differ in mode structure.

28. The method of claim 26, wherein the first optical power form and the second optical power form differ in wavelength.

29. The method of claim 26, wherein the first optical power form and the second optical power form differ in polarization.

30. The method of claim 26, wherein the first optical power form and the second optical power form differ in optical bandwidth.

31. The method of claim 26, wherein the first optical power source includes at least one electrically-powered light source.

32. The method of claim 26, wherein the first optical power source includes at least one laser.

33. The method of claim 26, wherein the first optical power source includes at least one semiconductor laser.

34. The method of claim 26, wherein the first optical power source includes at least one fiber laser.

35. The method of claim 26, wherein the first optical power source includes at least one solid-state laser.

36. The method of claim 26, wherein the first optical power source includes a control element configured to control the optical output in response to a control signal.

37. The method of claim 26, wherein the first optical receiver is configured to convert the first optical power form to electrical power of at least a first electrical power form.

38. The method of claim 26, wherein the first optical receiver includes a control circuit configure to control the operation of at least one optical power converter.

39. The method of claim 26, wherein the first optical coupler includes at least one of a wavelength division multiplexer (WDM), a polarization combiner, or a mode combiner.

40. The method of claim 26, wherein the first electrical power form and the second electrical power form differ in frequency.

41. The method of claim 26, wherein the first electrical power form and the second electrical power form differ in polarity.

42. The method of claim 26, wherein the first electrical power form and the second electrical power form differ in phase.

43. The method of claim 26, further comprising transmitting at least the first optical power form and the second optical power form at least partially through an optical conduit.

44. The method of claim 43, wherein the optical conduit includes at least one of an optical fiber or a photonic crystal fiber.

45. The method of claim 43, wherein the optical conduit includes a holey fiber.

46. The method of claim 26, wherein at least one characteristic of one of the optical power sources is adjusted based on at least one characteristic of a load coupled to at least one of the first and second optical power receivers and the at least one characteristic of the load is sensed by a sensor configured to sense the at least one characteristic of the load.

47. A power transmission system, comprising:
- a means for generating at least a first optical power form and a second optical power form;
- a means for transmitting at least the first optical power form and the second optical power form at least partially over free space;
- a means for receiving at least the first optical power form by a first optical receiver and the second optical power form by a second optical receiver; and
- a means for converting the first optical power form into a first power output having a first power form and a second power output having a second power form;
- a means for producing at least two components of an alternating current electrical power form using the first power form and the second power form, wherein the alternating current electrical power form includes a multi-phase alternating current electrical power form.

48. The system of claim 47, wherein the first optical power form and the second optical power form differ in mode structure.

49. The system of claim 47, wherein the first optical power form and the second optical power form differ in wavelength.

50. The system of claim 47, wherein the first optical power form and the second optical power form differ in polarization.

51. The system of claim 47, wherein the first optical power form and the second optical power form differ in optical bandwidth.

* * * * *